United States Patent [19]

Burdick

[11] 3,825,094

[45] July 23, 1974

[54] REMOTE CONTROL FOR AIR BEARING TRANSPORTERS AND THE LIKE

[75] Inventor: Robert E. Burdick, Santa Barbara, Calif.

[73] Assignee: Rolair Systems, Inc., Santa Barbara, Calif.

[22] Filed: Aug. 6, 1973

[21] Appl. No.: 385,963

[52] U.S. Cl............... 180/125, 180/121, 214/1 BE
[51] Int. Cl............................................. B60v 1/00
[58] Field of Search.......... 214/1 BE; 180/116, 117, 180/118, 119, 120, 121, 122, 124, 125, 127, 128, 129, 126, 6.48

[56] References Cited
UNITED STATES PATENTS

| | | | |
|---|---|---|---|
| 3,237,708 | 1/1966 | Strasser et al. | 180/127 X |
| 3,598,198 | 8/1971 | Williams | 180/118 X |
| 3,648,799 | 3/1972 | Young et al. | 180/118 |
| 3,756,342 | 9/1973 | Burdick | 180/124 |

Primary Examiner—Robert S. Ward, Jr.
Assistant Examiner—Gene A. Church
Attorney, Agent, or Firm—Harris, Kern, Wallen & Tinsley

[57] ABSTRACT

An air cushion transporter for moving large loads, typically 300,000 pounds, on air cushions using remote control permitting the operator to walk along with the transporter guiding it in forward, reverse, right and left rotational directions. A transporter with load carrying platform, plurality of air bearings, plurality of drive units and a pivot unit, and a remote control unit with components for selectively, separately and simultaneously actuating the drive and pivot units. A remote control unit readily carried by the operator providing manual control of direction and velocity and dead-man control for air bearing shut-off and drive motor braking. A transporter suitable for operation with air or other gas or a liquid.

11 Claims, 6 Drawing Figures

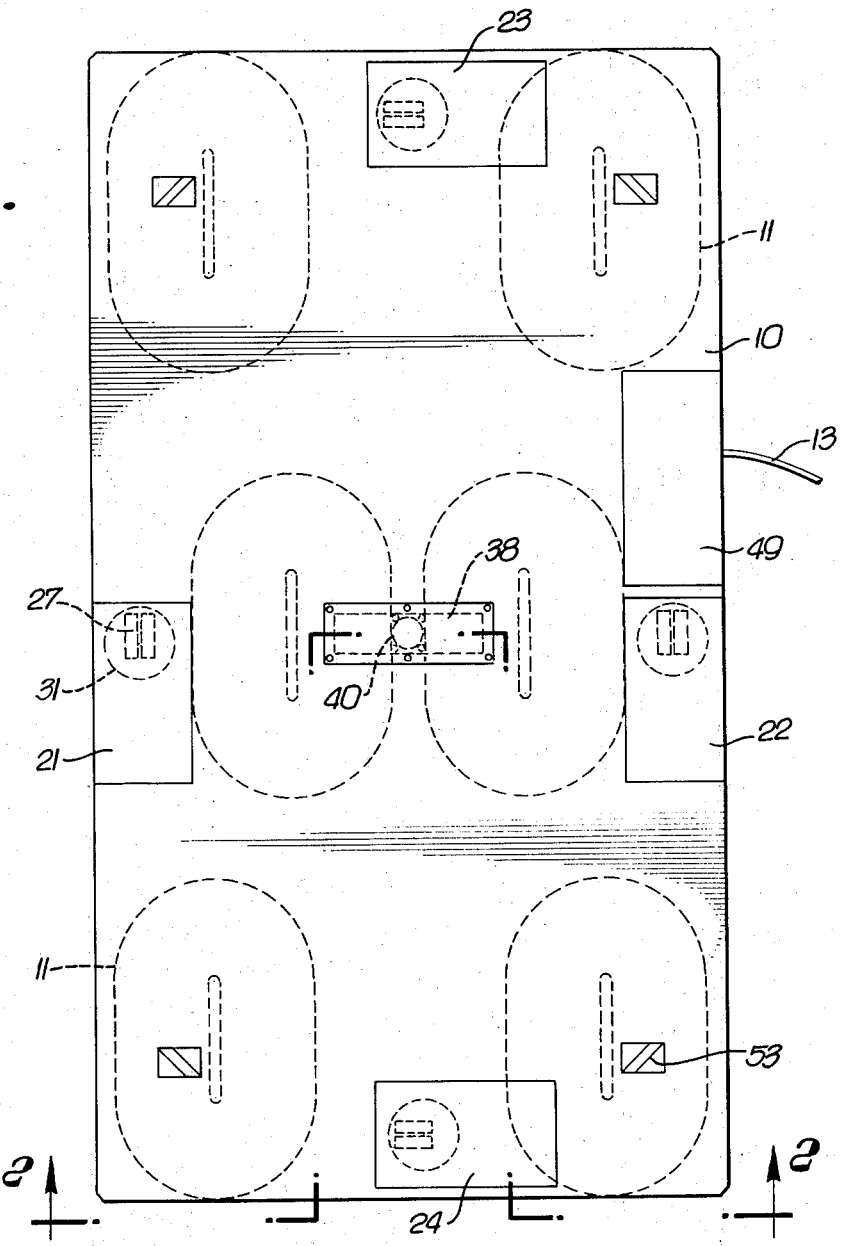
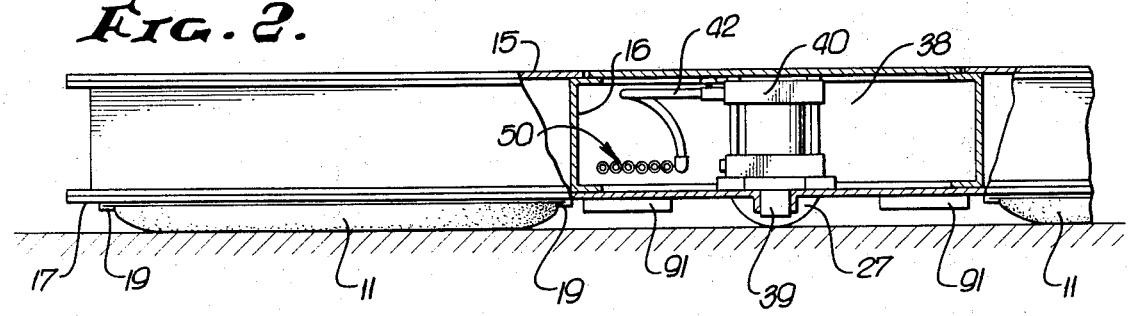

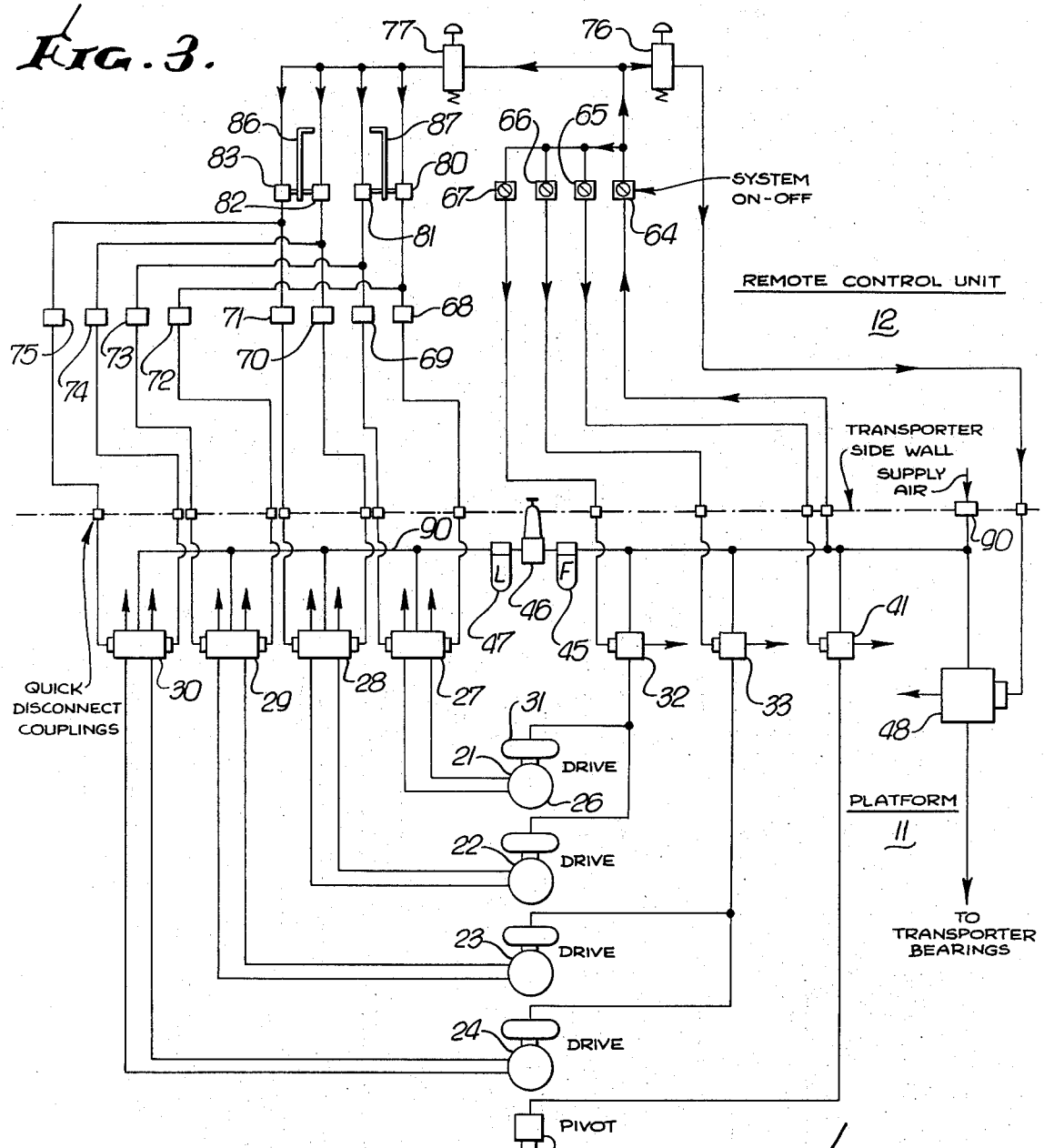

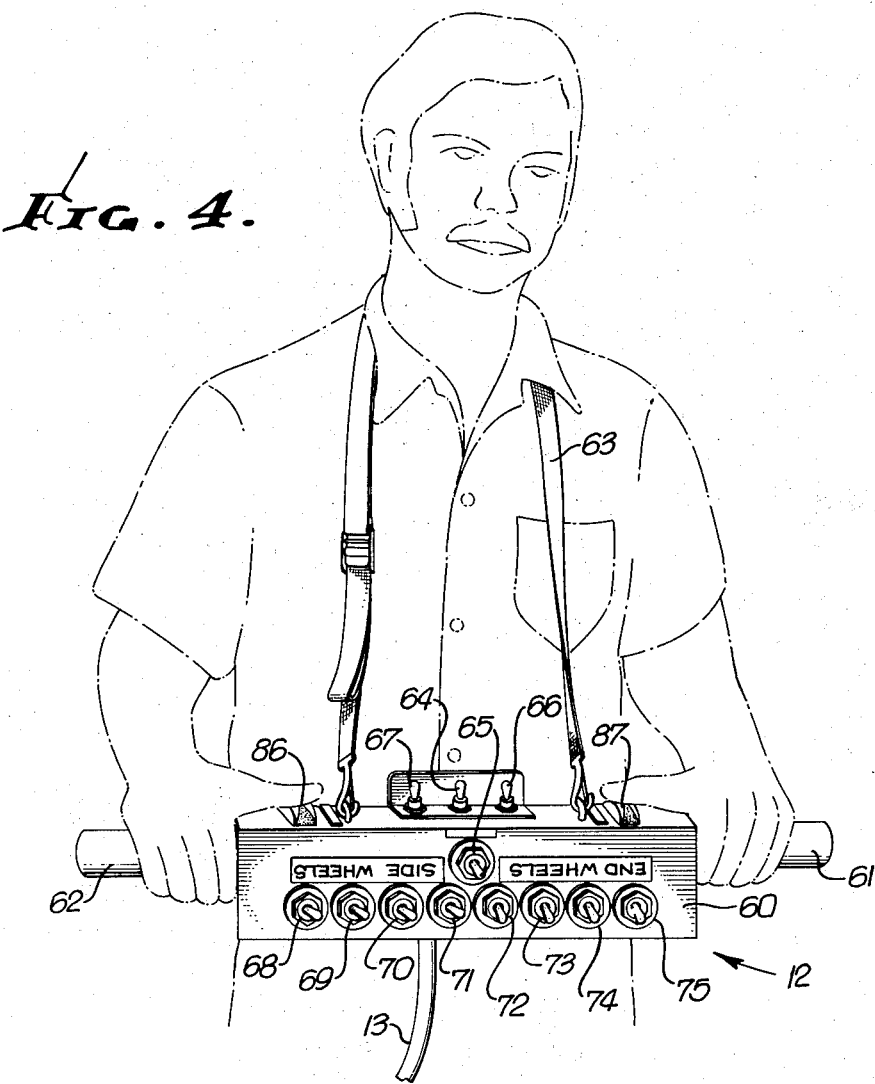
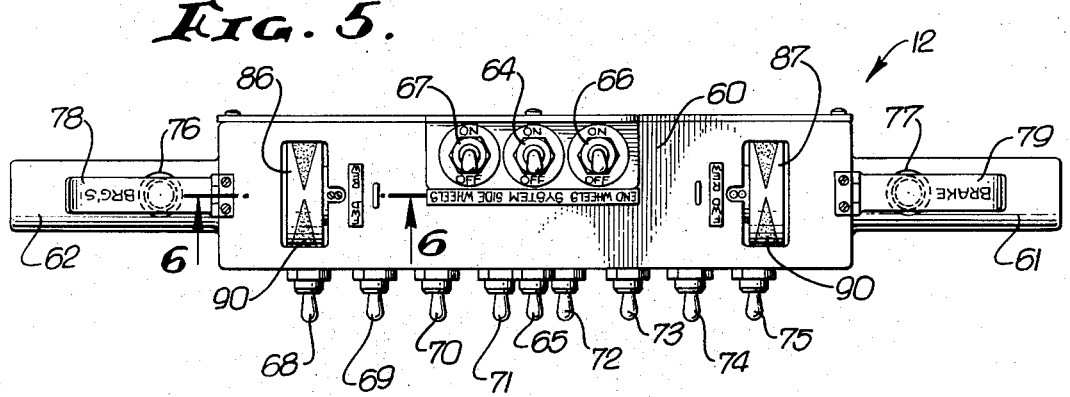

REMOTE CONTROL FOR AIR BEARING TRANSPORTERS AND THE LIKE

This invention relates to air cushion type load transporters incorporating air bearings for lifting and for providing a low friction to movement along the ground surface. Air bearings have been in use in transporters for some time and conventional air bearings are shown in the transporter disclosed herein. The transporter of the present invention is particularly intended for handling large loads and a typical unit is in the order of 11 by 20 feet and 1 foot high with a load capacity of 300,000 pounds. The present invention is specifically directed to a combination of transporter and control unit, with the control unit being suitable for carrying by an operator walking along side the transporter. The control unit incorporates on-off controls and velocity controls which provide the operator with a continuous control over the velocity and direction of movement of the transporter. The remote control unit may be coupled to the transporter by a single flexible cable carrying a plurality of air lines therein and typically less than 1 inch in diameter.

In the preferred embodiment, the operator sets the appropriate switches on the remote control unit, grasps the hand grips, and has complete control of the transporter by means of two thumb operated wheels.

Accordingly, it is an object of the present invention to provide such a new and improved air cushion transporter. Other objects, advantages, features and results will more fully appear in the course of the following description. The drawings merely show and the description merely describes a preferred embodiment of the present invention which is given by way of illustration or example.

In the drawings:

FIG. 1 is a top view of the platform of an air cushion transporter incorporating the presently preferred embodiment of the invention;

FIG. 2 is an enlarged partial sectional view taken along the line 2—2 of FIG. 1;

FIG. 3 is a pneumatic schematic of the transporter;

FIG. 4 is a front view showing an operator with the remote control unit;

FIG. 5 is a top view of the remote control unit of FIG. 4; and

FIG. 6 is an enlarged partial sectional view taken along the line 6—6 of FIG. 5.

The air cushion transporter described herein includes a platform 10 having a plurality of air bearings 11 mounted therein (FIGS. 1 and 2) and a remote control unit 12 (FIGS. 4–6) connected to the platform by a cable 13 comprising a plurality of air lines.

The platform 10 may be conventional in construction and typically comprises an upper plate 15, a plurality of channels 16, and a lower plate 17 welded together forming an integral unit. The air bearings 11 may be conventional units and preferably are designed for sliding insertion and removal in brackets 19 carried on the underside of the platform 10. A typical platform with a plurality of replaceable air bearings is shown in the copending application of Robert E. Burdick entitled Replaceable Air Cushion Device, Ser. No. 180,666, Filed Sept. 15, 1971 now U.S. Pat. No. 3,756,342 and assigned to same assignee as the present application.

Four conventional drive units 21, 22, 23, 24 are mounted in the platform 10, each along an edge, with the drive units 21, 22 oriented for fore and aft movement and with the drive units 23, 24 oriented for lateral movement. Each of the drive units includes an air motor 26 driving a pair of wheels 27, with the air motors controlled in speed and direction by control valves 27, 28, 29, 30, respectively. The wheels and air motor are pivotally mounted in the drive unit and are urged to an upward position out of engagement with the ground surface by a spring (not shown). Each drive unit includes an air cylinder 31 which urges the wheels downward into engagement with the ground surface when the air cylinder is energized, with the air cylinders of drive units 21, 22 controlled by valve 32 and with the air cylinders of drive units 23 and 24 controlled by valve 33.

A pivot unit 38 is mounted in the center of the platform 10 and includes a plunger 39 carried in a cylinder 40, with the plunger spring loaded to an up position as shown in FIG. 2. Air is introduced under pressure into the cylinder from a control valve 41 via line 42 urging the plunger 39 downward into engagement with the ground surface. The pneumatic components of the platform are shown in the lower portion of the diagram of FIG 3 and include a filter 45, a regulator 46, a lubricator 47, an on-off valve 48, and appropriate connectors and conduits. The majority of the pneumatic components are mounted in a plumbing compartment 49 with the inter connections of FIG. 3 being made by appropriate lines including those shown at 50. Lifting lugs 53 may be flush mounted in the top surface of the platform if desired.

The remote control unit 12 includes a housing 60 with hand grips 61, 62 at each end thereof. The housing is designed for carrying by the operator, as by means of a neck strap 63, leaving the operator's hands for manipulating the controls. Toggle operated air switches 64–75 are mounted in the housing of the remote control unit. A push button operated valve 76 is mounted in the handle 62 and is spring loaded to the up or off position. The valve 76 is moved to the down or on position by the operator manually grasping the handle 62 and a lever 78 pivotally mounted on the housing. A similar valve 77 is mounted in the handle 61 for operation by a lever 79.

Four pressure regulators 80, 81, 82, 83 are mounted in the housing, with the regulators 82, 83 shown in greater detail in FIG. 6. The regulators 82, 83 are mounted with their control shafts 84, 85 positioned end to end in a control wheel 86, with the wheel projecting above the surface of the housing for actuation by the thumb of the operator. The wheel 86 may be fastened to the shafts 84, 85 by conventional means such as set screws, so that the pressure setting of one regulator is increased and the pressure setting of the other regulator is corresponding decreased when the wheel 86 is rotated. The regulators 80, 81 are similarly installed with a wheel 87. The interconnections between the components and the housing are illustrated in the upper portion of FIG. 3. The main air supply for the air bearings and the controls is connected to the platform at a coupling 90. As stated previously, the remote control unit is connected to the platform by the cable 13 having thirteen air lines therein, the cable 13 being a flexible unit typically in the order of one inch diameter and twenty feet in length.

The transporter with load or without load, may be moved in the forward and rearward direction by moving switch 64 to the on position, moving switches 65 and 66 to the off position, moving switch 67 to the on position, moving switches 68–71 to the on position, and moving switches 72–75 to the off position. The thumb wheels 86 and 87 are moved to the zero or centered position as indicated by the tapered markings 90, and the transporter is ready for operation with the main air supply connected at the coupling 90. The operator next grasps the handle 62 squeezing lever 78 and opening the valve 76, providing control air to open the valve 48 and provide air to the air bearings. The air bearings inflate in the normal manner and raise the transporter on the air film. Control air provided through the valve 67 to valve 32 for energizing the air cylinders of the drive units 21, 22 moving the wheels downward into engagement with the ground surface. The valves 27–30 are spring centered spool valves which will close both lines to the corresponding air motor when the valve is centered, thereby preventing rotation of the air motor so that the drive unit functions as a brake.

The operator also grasps the handle 61 squeezing lever 79 and opening the valve 77 providing air to the valves 27, 28 through the regulators 80–83 and switches 68–71. With the thumb wheels 86, 87 in the zero or center position, equal pressures will be provided to both sides of each of the valves 27, 28 so that there is no rotation of the drive motors. The operator now rotates the thumb wheels 86, 87 in the forward direction increasing the pressure output of one regulator of each pair and decreasing the pressure output of the other regulator of the pair. The spools of the valves 27, 28 are displaced, providing air from the line 90, through the valve to the drive motor, back to the valve and to exhaust. The air motor speed is a function of the movement of the corresponding thumb wheel resulting in increasing or decreasing differential pressure across spools of valves 27 and 28 thereby further or lesser displacing the spools allowing more or less air to pass to the air motors 21 and 22 and the operator may increase and decrease the forward speed of the transporter as desired by rotating the two thumb wheels. The transporter may be steered to the right and to the left by advancing one thumb wheel more than the other. The transporter may be moved in the opposite direction by rotating the thumb wheels in the opposite direction from the zero position. The transporter speed is reduced by moving the thumb wheels toward the zero or center position. Faster braking may be achieved by releasing the hand grip 61 permitting the valve 77 to move to the closed position with the resultant braking of the drive motors. Fast stops may also be obtained by releasing the hand grip 62 permitting the valve 76 to close and shutting off the air supply to the air bearings. The air bearings will immediately deflate and the transporter will come to rest on the support pads 91.

Movement of the transporter to the right and to the left may be achieved by closing switch 67 and opening switch 66, and closing switches 68–71 and opening switches 72–75. The drive units 21, 22 are now out of service and the drive units 23, 24 are in service and are controlled in the same manner as described in the preceding paragraph.

The transporter may be rotated about the central pivot 38 by moving the switch 65 to the on position to provide control air for opening the valve 41 and moving the plunger 39 down into engagement with the ground surface. The transporter may be driven in rotation with the side drive units 21, 22 or with the end drive units 23, 24 or with all four drive units as desired, with the rotations being achieved by moving one thumb wheel in the forward direction and one thumb wheel in the rearward direction.

The transporter may also be rotated about any one of the drive units, with the central pivot in the retracted position. For example, switches 64 and 67 and switches 68-71 may be opened, with switches 65 and 66 and 72–75 closed and levers 78 and 79 depressed. The wheels of drive unit 22 will be braked by virtue of keeping the thumb wheel 86 in the null position, and the drive unit 21 is operated by the thumb wheel 87 to provide the drive force in either direction. By reversing thumb wheel actions only and keeping the same switch settings, the transporter can be rotated about the opposite drive unit 21. Other combinations for rotating the transporter will be readily apparent. The valves 76, 77 function as dead man controls, providing substantially instanteous stops whenever the operator releases his graps of the hand grips.

The transporter of the present invention has a very large carrying capacity (300 tons), yet very low profile (12 inches), and includes all tractive propulsion means for motion. To accomodate loads of virtually any shape including those which would overhand the transporter, all controls are provided in a single, remote package suspended from the operator's neck and manipulated by his two hands. This permits the operator to station himself at any convenient location within the length of the umbilical cord and to observe clearance conditions at whatever location they may occur. The remote control operates from the identical energy source (remotely pressurized fluid) as the transporter, a safety feature in that there is no way energy could be lost while propulsion energy remains. The transporter is highly maneuverable, with variable speed and aft and laterally (right or left), can be driven on any turning radius including pivoting about any one of its drive wheels and even pivoting about its own geometeric center. The transporter and its controls can be operated from any pressurized fluid (usually air); for fluids, the exhaust ports of the valves would simply need to be routed to a collector for disposal or repumping as opposed to air, which is conveniently dumped directly to the atmosphere.

I claim:

1. A fluid cushion transporter comprising a load carrying platform, a plurality of fluid bearings mounted in said platform for supporting the platform above a ground surface when inflated, and a remote control unit coupled to said platform by a plurality of flexible fluid lines, said platform including:

first and second spaced drive units each including a fluid motor for driving said transporter along the ground surface in forward and rearward directions;

third and fourth sapced drive units each including a fluid motor for driving said transporter along the ground surface in the right and left directions, each of said four drive units including power means for engaging the drive unit with the ground surface; and a fluid valve for each of said drive units for supplying fluid under pressure to the drive motor thereof with the speed and direction of a drive motor varying as a function of fluid valve output;

said remote control unit including:

first means for controlling fluid supply to said fluid bearings;

second means for energizing said power means of said first and second drive units;

third means for energizing said power means of said third and fourth drive units;

fourth means for controlling fluid supply to the fluid valves of one of said first and second drive units and one of said third and fourth drive units; and fifth means for controlling fluid supply to the fluid valve of the other of said first and second drive units and the other of said third and fourth drive units.

2. A transporter as defined in claim 1 wherein each of said fourth and fifth means includes first and second fluid pressure regulators having control shafts, and regulator control means engaging said shafts for simultaneous adjustment of said first and second regulators in opposite directions.

3. A transporter as defined in claim 2 including means for mounting said regulators with said shafts directed toward each other, with said control means comprising a single manual control wheel mounted on the two shafts.

4. A transporter as defined in claim 2 including a pair of fluid lines from said fourth means to said first drive unit valve and a pair of fluid lines to said third drive unit valve, a pair of fluid lines from said fifth means to said second drive unit valve and a pair of fluid lines to said fourth drive unit valve, and an on-off control in each of said fluid lines between the regulator and the air valve.

5. A transporter as defined in claim 4 including a retractable pivot pin carried in said platform and including power means for engaging the pivot pin with the ground surface, and sixth means in said remote control unit for energizing said power means of said pivot pin.

6. A transporter as defined in claim 5 wherein said remote control unit includes a housing with hand grips at opposite ends, with two of said regulators mounted in said housing adjacent each of said hand grips with the control shafts thereof directed toward each other, and a single control wheel mounted on the two shafts and projecting from said housing for rotation by an operators thumb while grasping the adjacent hand grip.

7. A transporter as defined in claim 6 with said first means mounted in one of said hand grips and spring loaded to an outwardly projecting fluid off position, with a first lever pivotally mounted at said one hadn grip and overlying said first means for moving it to the fluid on position when an operator grasps the hand grip.

8. A transporter as defined in claim 7 including seventh means for controlling fluid supply to said platform fluid valves and mounted in the other of said hand grips and spring loaded to an outwardly projecting air off position, with a second lever pivotally mounted at said other hand grip and overlying said seventh means for moving it to the fluid on position when an operator grasps the hand grip.

9. A transporter as defined in claim 1 including a retractable pivot pin carried in said platform and including power means for engaging the pivot pin with the ground surface, and sixth means in said remote control unit for energizing said power means of said pivot pin.

10. A transporter as defined in claim 9 wherein said remote control unit includes a housing with hand grips at opposite ends, and each of said fourth and fifth means includes first and second fluid pressure regulators mounted in said housing adjacent a hand grip, with the first and second regulators having control shafts directed toward each other, and a single control wheel mounted on the two shafts and projecting from the housing for rotation by an operators thumb while grasping the adjacent grip, with the control wheel providing for simultaneous adjustment of the first and second regulators in opposite directions.

11. A fluid cushion transporter comprising a load carrying platform, a plurality of fluid bearings mounted in said platform for supporting the platform above a ground surface when inflated, and a remote control unit coupled to said platform by a plurality of flexible fluid lines, said platform including:

first and second spaced drive units each including a fluid motor for driving said transporter along the ground surface in forward and reverse directions, each of said drive units including power means for engaging the drive unit with the ground surface; and a fluid valve for each of said drive units for supplying fluid under pressure to the drive motor thereof with the speed and direction of a drive motor varying as a funciton of fluid valve output;

said remote control unit including:

first means for controlling fluid supply to said fluid bearings;

second means for energizing said power means of said first and second drive units;

third means for controlling fluid supply to the fluid valves of said first drive unit; and fourth means for controlling fluid supply to the fluid valve of said second drive unit;

each of said third and fourth means including first and second fluid pressure regulators with control shafts directed toward each other, and a single control wheel mounted on the two shafts for simultaneous adjustment of the first and second regulators in opposite directions.

* * * * *